(12) United States Patent
Zhang et al.

(10) Patent No.: US 9,668,186 B2
(45) Date of Patent: May 30, 2017

(54) METHOD, DEVICE AND SYSTEM FOR PROCESSING RADIO LINK FAILURE REPORT AND FOR STATISTICALLY PROCESSING ABNORMAL EVENT

(71) Applicant: Huawei Technologies Co., Ltd., Shenzhen (CN)

(72) Inventors: Huan Zhang, Shenzhen (CN); Xuelong Wang, Shenzhen (CN); Henrik Olofsson, Shenzhen (CN); Ping Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 14/512,743

(22) Filed: Oct. 13, 2014

(65) Prior Publication Data
US 2015/0029835 A1    Jan. 29, 2015

Related U.S. Application Data

(63) Continuation of application No. PCT/CN2013/073923, filed on Apr. 9, 2013.

(30) Foreign Application Priority Data

Apr. 13, 2012    (CN) .......................... 2012 1 0108951

(51) Int. Cl.
*H04W 36/22*    (2009.01)
*H04W 24/04*    (2009.01)
(Continued)

(52) U.S. Cl.
CPC ......... *H04W 36/22* (2013.01); *H04L 41/0668* (2013.01); *H04L 45/28* (2013.01);
(Continued)

(58) Field of Classification Search
CPC ..... H04W 36/22; H04W 24/10; H04W 24/02; H04L 12/24; H04L 45/28; H04L 41/0668
See application file for complete search history.

(56) References Cited

U.S. PATENT DOCUMENTS

2012/0069732 A1*  3/2012  Xu .................... H04W 76/027
                                                         370/221
2014/0112310 A1*  4/2014  Teyeb ................ H04W 36/30
                                                         370/332
2014/0194123 A1    7/2014  Wang et al.

FOREIGN PATENT DOCUMENTS

CN    101815314 A      8/2010
CN    102104904 A  *   6/2011  ............ H04W 24/10
(Continued)

OTHER PUBLICATIONS

Huawei, "Implications of MRO Performance Measurements," 3GPP TSG-RAN WG3 #65bis, Mizyazaki, Japan, Oct. 2009, R3-092324, 6 pages.
(Continued)

*Primary Examiner* — Lakeram Jangbahadur
(74) *Attorney, Agent, or Firm* — Brinks Gilson & Lione

(57) ABSTRACT

A device and a system for processing a radio link failure report and for statistically processing an abnormal event include: a user equipment generates a radio link failure report, wherein the radio link failure report carries an A2 event indication recorded by the user equipment; and reports the radio link failure report.

15 Claims, 4 Drawing Sheets

(51) Int. Cl.
*H04L 12/24* (2006.01)
*H04L 12/703* (2013.01)
*H04W 24/10* (2009.01)
*H04W 36/00* (2009.01)
*H04W 24/02* (2009.01)

(52) U.S. Cl.
CPC ............ *H04W 24/04* (2013.01); *H04W 24/02* (2013.01); *H04W 24/10* (2013.01); *H04W 36/0083* (2013.01)

(56) References Cited

FOREIGN PATENT DOCUMENTS

| | | | |
|---|---|---|---|
| CN | 102111781 A | 6/2011 | |
| CN | 102413494 A | 4/2012 | |
| EP | 2 418 914 A1 | 2/2012 | |
| SE | EP 2418914 A1 * | 2/2012 | ............ H04W 88/02 |
| WO | WO 2011135163 A1 | 11/2011 | |
| WO | WO 2012/039586 A1 | 3/2012 | |

OTHER PUBLICATIONS

Nokia Corporation, "MDT Coverage and Capacity Optimization," 3GPP TSG-RAN WG2 Meeting #67bis, Miyazaki, Japan, Oct. 2009, R2-096049, 6 pages.
Nokia Siemens Networks, "Distinguish Trigger in MRO Measurements of Too Late Handovers," 3GPP TSG SA WG5 (Telecom Management) Meeting #78, Nanjing, China, Oct. 2011, S5-113108, 3 pages.

* cited by examiner

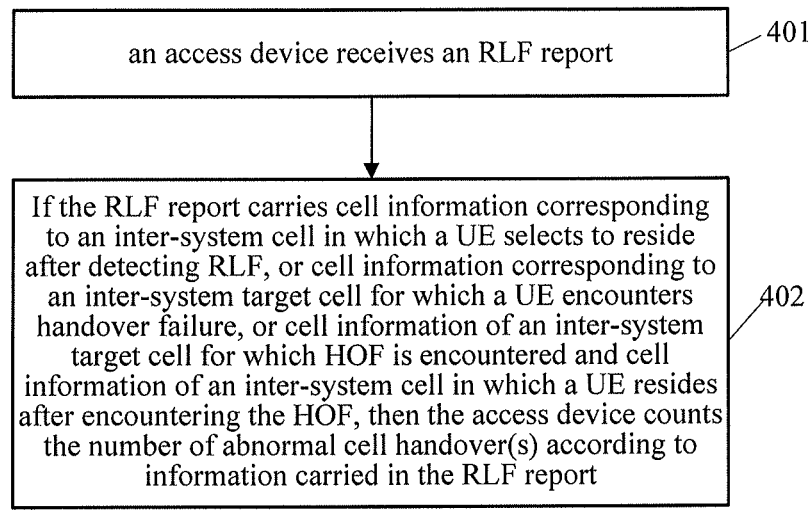
FIG.4
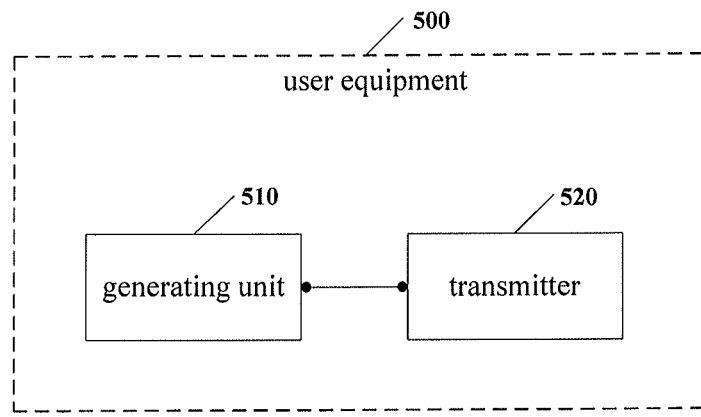
FIG.5
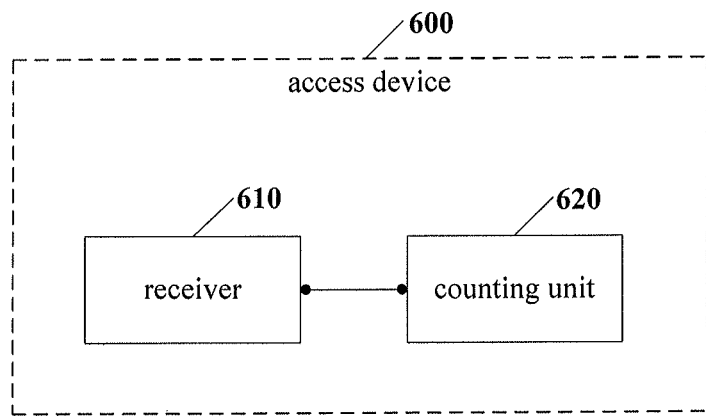
FIG.6-a

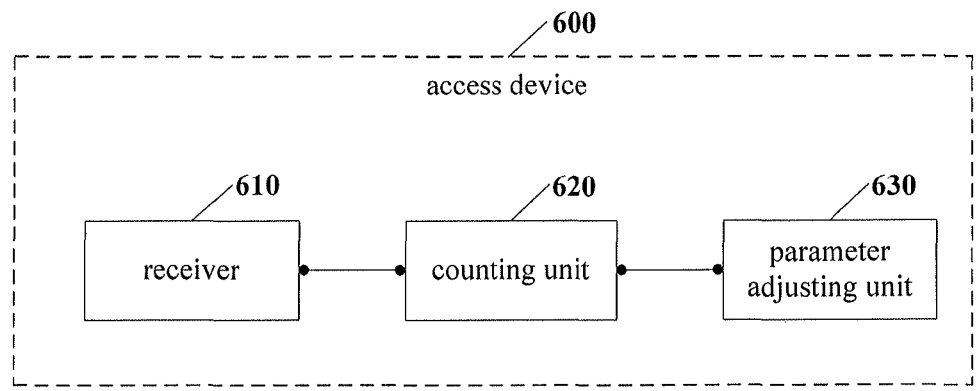
FIG.6-b
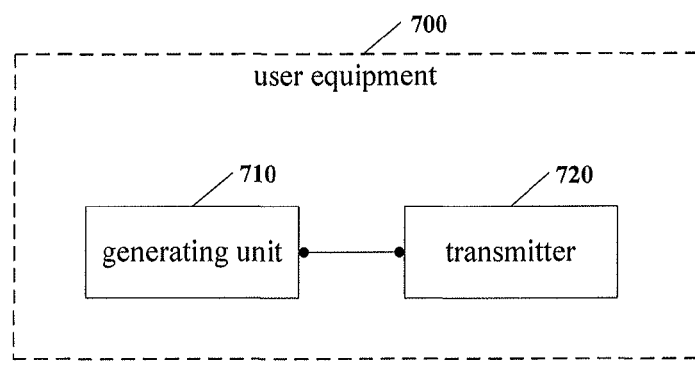
FIG.7
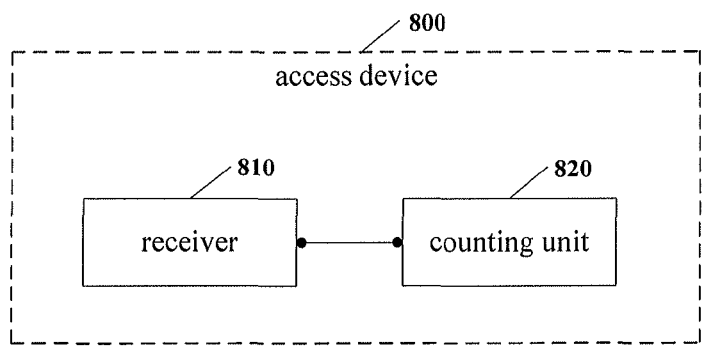
FIG.8-a

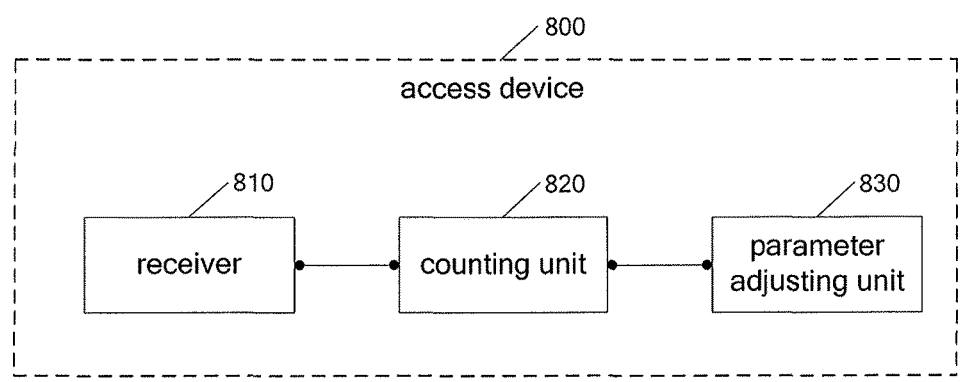
FIG.8-b
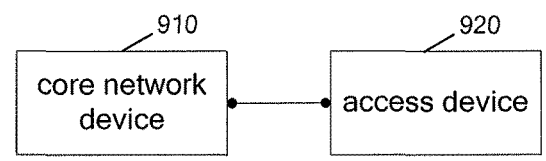
FIG.9

METHOD, DEVICE AND SYSTEM FOR PROCESSING RADIO LINK FAILURE REPORT AND FOR STATISTICALLY PROCESSING ABNORMAL EVENT

CROSS-REFERENCE TO RELATED APPLICATIONS

This application is a continuation of International Patent Application No. PCT/CN2013/073923, filed on Apr. 9, 2013, which claims priority to Chinese Patent Application No. 201210108951.1, filed on Apr. 13, 2012, both of which are hereby incorporated by reference in their entireties.

TECHNICAL FIELD

The present invention relates to the field of communications technologies, and in particularly, to a method, a device and a system for processing a radio link failure report and for statistically processing an abnormal event.

BACKGROUND

A late handover scenario, an early handover scenario and an incorrect cell handover scenario resulting from improper setting of handover parameters are defined in a 3GPP (the 3rd generation partnership project, The 3rd Generation Partnership Project) R10 protocol.

Wherein, late handover is as follows: a user equipment (UE, User Equipment) encounters radio link failure (RLF, Radio link failure) in a source cell before initiating a handover or when a handover is ongoing, and then, the UE initiates a radio resource control (RRC, Radio Resource Control) reconstruction in a non-source cell. The reconstruction may succeed or fail, in order to enable a source base station to identify such abnormal handover as late handover, a reconstructed target base station will send an RLF indication (indication) message to the source base station in which the RLF encountered, for enabling the source base station to judge, count and adjust the handover parameters when a subsequent regulation and optimization cycle is up, so as to achieve the purpose of reducing or even avoiding the occurrence of such abnormal handover. Early handover is as follows: the UE encounters the RLF in a short period after successful handover from the source cell to a target cell, and then, the UE initiates the RRC reconstruction in the source cell. Incorrect cell handover is as follows: the UE encounters the RLF in a short period after successful handover from the source cell to the target cell, and then, the UE also initiates the RRC reconstruction in a non-source cell and a non-target cell.

For optimization, it is defined in the 3GPP R10 that, when the UE undergoes handover failure (HOF, Handover failure) or RLF, the UE records some relevant information prior to RLF or HOF, e.g., information of the source cell and target cell subjected to RLF and HOF, or the like, these information is contained in an RLF report (report) with standard definition, when the UE records the RLF report, the UE may report the RLF report to a reconstructed or newly constructed target base station during RRC reconstruction or new RRC construction, and the base station sends an RLF indication (indication) message containing the RLF report to the base station to which the affected source cell belongs, so that the base station to which the source cell belongs may identify, count and optimize relevant scenarios based on the RLF report.

A mobility robustness optimization (MRO, Mobility Robustness Optimization) scenario mainly includes intra-frequency, inter-frequency and inter-system scenarios in a system. At present, the base station could not implement relevant optimization in some scenarios based on the RLF report with existing standard definition.

SUMMARY

Embodiments of the present invention provide a method, a device and a system for processing a radio link failure report and for statistically processing an abnormal event, in order to improve the handover parameter optimization capability of a network side.

An aspect of the present invention provides a method for processing a radio link failure report, may include:

generating, by a user equipment, a radio link failure report, wherein the radio link failure report carries an A2 event indication recorded by the user equipment; and reporting the radio link failure report.

Another aspect of the present invention further provides a method for statistically processing an abnormal event, may include:

receiving, by an access device, a radio link failure report; and counting radio link failure RLF event(s) relevant to an A2 threshold according to an A2 event indication, if the radio link failure report carries the A2 event indication.

Another aspect of the present invention further provides a method for processing a radio link failure report, may include:

generating, by a user equipment, a radio link failure report, wherein the radio link failure report carries cell information of an inter-system cell in which the user equipment selects to reside after encountering radio link failure RLF, or cell information of an inter-system target cell for which the user equipment encounters handover failure HOF, or cell information of an inter-system target cell for which the user equipment encounters HOF and cell information of an inter-system cell in which the user equipment resides after encountering the HOF; and reporting the radio link failure report.

Another aspect of the present invention further provides a method for statistically processing an abnormal event, may include:

receiving, by an access device, a radio link failure report; and counting the number of abnormal cell handover(s) according to information carried in the radio link failure report, if the radio link failure report carries cell information of an inter-system cell in which a user equipment selects to reside after encountering radio link failure RLF, or cell information of an inter-system target cell for which a user equipment encounters handover failure HOF, or cell information of an inter-system target cell for which a user equipment encounters HOF and cell information of an inter-system cell in which the user equipment resides after encountering the HOF.

Another aspect of the present invention further provides a user equipment, may include:

a generating unit, configured to generate a radio link failure report, wherein the radio link failure report carries an A2 event indication recorded by the user equipment; and a transmitter, configured to report the radio link failure report generated by the generating unit.

Another aspect of the present invention further provides an access device, may include:

a receiver, configured to receive a radio link failure report; and a counting unit, configured to count RLF event(s) relevant to an A2 threshold according to an A2 event indication, if the radio link failure report received by the receiver carries the A2 event indication.

Another aspect of the present invention further provides a user equipment, may include:

a generating unit, configured to generate a radio link failure report, wherein the radio link failure report carries cell information of an inter-system cell in which the user equipment selects to reside after encountering radio link failure RLF, or cell information of an inter-system target cell for which the user equipment encounters handover failure HOF, or cell information of an inter-system target cell for which the user equipment encounters HOF and cell information of an inter-system cell in which the user equipment resides after encountering the HOF; and a transmitter, configured to report the radio link failure report.

Another aspect of the present invention further provides an access device, may include:

a receiver, configured to receive a radio link failure report; and a counting unit, configured to count the number of abnormal cell handover(s) according to information carried in the radio link failure report, if the radio link failure report carries cell information of an inter-system cell in which a user equipment selects to reside after encountering radio link failure RLF, or cell information of an inter-system target cell for which a user equipment encounters handover failure HOF, or cell information of an inter-system target cell for which a user equipment encounters HOF and cell information of an inter-system cell in which the user equipment resides after encountering the HOF.

Another aspect of the present invention further provides a communication system, may include:

the access device in the above-mentioned embodiments.

Another aspect of the present invention further provides a communication system, may include:

A core network device and the access device in the above-mentioned embodiments, wherein, the core network device and the access device are connected in a communicative manner.

Thus, in a solution provided in an embodiment of the present invention, if an RLF report reported by a UE carries an A2 event indication recorded by the UE, an access device may count RLF event(s) relevant to an A2 threshold according to the A2 event indication in the RLF report, this may provide an effective basis for the access device to optimize the A2 threshold, so as to benefit the access device to obtain a better A2 threshold optimization effect.

In another technical solution provided in an embodiment of the present invention, if RLF report reported by a UE carries cell information of an inter-system cell in which the UE selects to reside after detecting RLF, or RLF report carries cell information of an inter-system target cell for which a UE encounters handover failure HOF, or cell information of an inter-system target cell for which a UE encounters HOF and cell information of an inter-system cell in which the UE resides after encountering the HOF, an access device may implement operations such as counting abnormal handover event(s) between inter-system cells, and the like, according to cell information of an inter-system target cell in the RLF report, and this may provide an effective basis for operations of the access device, such as optimizing handover parameters (e.g., an A2 threshold or the like) between the inter-system cells, and the like, so as to benefit the access device to obtain a better optimization effect of the handover parameters between the inter-system cells.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art will be given below. Apparently, the accompanying drawings described below are merely some of the embodiments of the present invention, based on which other drawings may be obtained by those skilled in the art without any creative efforts.

FIG. 4 is a schematic flowchart illustrating another method for statictically processing an abnormal event provided by an embodiment of the present invention;

FIG. 5 is a schematic diagram illustrating a user equipment provided by an embodiment of the present invention;

FIG. 6-a is a schematic diagram illustrating an access device provided by an embodiment of the present invention;

FIG. 6-b is a schematic diagram of illustrating another access device provided by an embodiment of the present invention;

FIG. 7 is a schematic diagram illustrating a user equipment provided by an embodiment of the present invention;

FIG. 8-a is a schematic diagram illustrating an access device provided by an embodiment of the present invention;

FIG. 8-b is a schematic diagram illustrating another access device provided by an embodiment of the present invention;

FIG. 9 is a schematic diagram illustrating a communication system provided by an embodiment of the present invention.

DESCRIPTION OF EMBODIMENTS

Embodiments of the present invention provide a method, a device and a system for processing a radio link failure report and for statistically processing an abnormal event, in order to improve the handover parameter optimization capability of a network side.

In order that those skilled in the art can better understand the solutions of the present invention, a clear and complete description of technical solutions in the embodiments of the present invention will be given below, in combination with the accompanying drawings in the embodiments of the present invention. Apparently, the embodiments described are merely a part, but not all, of the embodiments of the present invention. All of other embodiments, obtained by those skilled in the art based on the embodiments of the present invention without any creative efforts, fall into the protection scope of the present invention.

An A2 event in the present invention refers to an event meeting the following conditions of a serving cell:

Ms+Hys<Threshold; wherein, Ms refers to a measurement result of the serving cell, (for example, a reference signal receiving power (RSRP, Reference Signal Receiving Power) value or a reference signal received quality (RSRQ, Reference Signal Received Quality) value), Hys refers to a hysteresis parameter value of the A2 event, and Threshold is a threshold parameter for judging the occurrence of the A2 event, may be called as an A2 threshold (namely, the A2 threshold is used for judging whether the A2 event occurs). Namely, when the sum of the measurement result of the serving cell and the hysteresis is smaller than the A2 threshold, it indicates that the A2 event occurs.

In an embodiment of the method for processing an RLF report of the present invention, the method may include: a user equipment generates an RLF report, wherein the RLF report carries an A2 event indication recorded by the user equipment; and the user equipment reports the RLF report.

Figure 1:
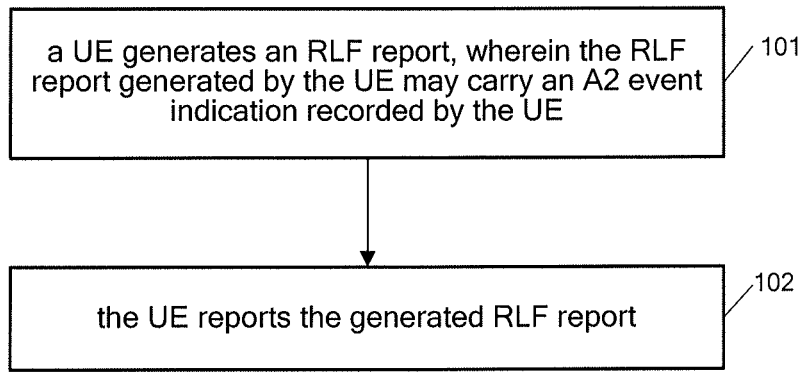
FIG. 1 is a schematic flowchart illustrating a method for processing an RLF report provided by an embodiment of the present invention.

Referring to FIG. 1, an embodiment of the present invention provides a method for processing an RLF report, may include the following contents:

101. a UE generates an RLF report, wherein the RLF report may carry an A2 event indication recorded by the UE.

102. the UE reports the generated RLF report.

Wherein, if the UE initiates an RRC reconstruction or a new construction after undergoing RLF or HOF, the UE may send the generated RLF report to a base station of a target cell for which the RRC reconstruction or the new construction initiated.

For example, in an LTE system, an inter-frequency and inter-system measurement handover strategy is as follows: when a serving cell of the UE is smaller than a threshold (namely, an A2 threshold (Threshold), an inter-frequency A2 threshold and an inter-system A2 threshold may be set to be identical or different), the UE may start an inter-frequency (or inter-system) measurement, and when the measurement satisfies a corresponding event (e.g. an A4 event, a B1 event), the UE may implement corresponding handover. Since the inter-frequency and inter-system measurement will start a measurement gap (measurement gap) or the like, unnecessary measurement should be avoided reasonably, and meanwhile, the measurement timeliness should be ensured to guarantee the success rate of handovers. Therefore, it is very important to control the reasonability of A2 threshold setting started by an inter-frequency or inter-system handover, and if the setting is unreasonable, it is necessary to be optimized and regulated.

It can be discovered in researches and practices that, assuming that the A2 threshold is set to be too low, namely, the inter-frequency or inter-system measurement is started under a condition that the signal quality of the serving cell is very poor, it is possible that all A2 event(s) may not be reported due to too poor signal quality, so that it has no time to start the inter-frequency or inter-system measurement, and finally leads to inter-frequency or inter-system handover failure in all probability. At this time, it may be considered to increase the A2 threshold, in this case, the UE will undergo the RLF, the UE will record information relevant to the RLF (for example, the UE records the information in the RLF report), if the A2 threshold is to be optimized, information relevant to the A2 event may be recorded in the RLF report generated and reported by the UE, thus an effective basis may be provided for an access device to optimize handover parameters (e.g., optimize the A2 threshold), so as to benefit the access device to obtain a better optimization effect of the handover parameters.

In an embodiment of the present invention, the RLF report generated by the UE carries an A2 event indication recorded by the UE, wherein the A2 event indication recorded by the UE may be used for, for example, indicating at least one of the following conditions: whether an inter-frequency A2 event or an inter-system A2 event has been satisfied before detecting RLF by the UE, and whether the UE has reported the inter-frequency A2 event or the inter-system A2 event. Of course, the A2 event indication recorded by the UE may also be used for indicating other information relevant to the A2 event.

For instance, the A2 event indication recorded by the UE may be used for indicating that, the UE does not detect that the serving cell satisfies the inter-frequency A2 event before detecting the RLF or the UE does not report the inter-frequency A2 event before detecting the RLF; or the A2 event indication recorded by the UE is used for indicating that, the UE detects that the serving cell satisfies the inter-frequency A2 event before detecting the RLF or the UE has reported the inter-frequency A2 event before detecting the RLF; or the A2 event indication recorded by the UE is used for indicating that, the UE does not detect that the serving cell satisfies the inter-system A2 event before detecting the RLF or the UE does not report the inter-system A2 event before detecting the RLF; or the A2 event indication recorded by the UE is used for indicating that, the UE detects that the serving cell satisfies the inter-system A2 event before detecting the RLF or the UE has reported the inter-system A2 event before detecting the RLF.

Wherein, the access device in an embodiment of the present invention may be a base station, a base station controller or other device with an access function in an access network.

Thus, in the present embodiment, if the RLF report generated and reported by the UE carries the A2 event indication recorded by the UE, the access device, according to the A2 event indication in the RLF report, may implement operations such as counting RLF event(s) relevant to the A2 threshold, and the like, this provides an effective basis for the access device to optimize the A2 threshold, so as to benefit the access device to obtain a better A2 threshold optimization effect.

In an application scenario, the UE may indicate corresponding conditions by setting different indicating bit values of the A2 event indication, it is taken as an example that the A2 event indication includes two indicating bits, for example, if the indicating bit value of the A2 event indication is 0 (namely, binary number "00"), it may express that the UE does not detect that the serving cell satisfies the inter-frequency A2 event before detecting the RLF or the UE does not report the inter-frequency A2 event before detecting the RLF; if the indicating bit value of the A2 event indication is 1 (namely, binary number "01"), it may express that the UE detects that the serving cell satisfies the inter-frequency A2 event before detecting the RLF or the UE has reported the inter-frequency A2 event before detecting the RLF; if the indicating bit value of the A2 event indication is 2 (namely, binary number "10"), it may express that the UE does not detect that the serving cell satisfies the inter-system A2 event before detecting the RLF or the UE does not report the inter-system A2 event before detecting the RLF; and if the indicating bit value of the A2 event indication is 3 (namely, binary number "11"), it may express that the UE detects that the serving cell satisfies the inter-system A2 event before detecting the RLF or the UE has reported the inter-system A2 event before detecting the RLF.

Or, the indication may be performed in a combined manner of explicit indication and implicit indication, for example, if no A2 indicator is contained in the RLF report, it expresses that the UE does not detect that the serving cell satisfies the inter-frequency A2 event or the inter-system A2 event before detecting the RLF or the UE does not report the inter-frequency A2 event or the inter-system A2 event before detecting the RLF; if the A2 indicator is contained in the RLF report and the value is 0, it may express that the UE detects that the serving cell satisfies the inter-frequency A2 event before detecting the RLF or the UE has reported the inter-frequency A2 event before detecting the RLF; if the A2 indicator is contained in the RLF report and the value is 1, it may express that the UE detects that the serving cell satisfies the inter-system A2 event before detecting the RLF or the UE has reported the inter-system A2 event before detecting the RLF, and vice versa. Thus, the A2 event indication only needs one indicating bit. In the scenario, the access device may determine whether the inter-frequency A2 event or the inter-system A2 event has been satisfied before detecting the RLF by the UE according to the received RLF report, or the access device may determine whether the UE has reported the inter-frequency A2 event or the inter-system A2 event according to the received RLF report. For example, if no A2 indicator is contained in the RLF report received by the access device, the access device may determine that the UE does not detect that the serving cell satisfies the inter-frequency or inter-system A2 event before detecting the RLF or the UE does not report the inter-frequency or inter-system A2 event before detecting the RLF; if the A2 indicator is contained in the RLF report received by the access device and the value is 0, the access device may determine that the UE detects that the serving cell satisfies the inter-frequency A2 event before detecting the RLF or the UE has reported the inter-frequency A2 event before detecting the RLF; and if the A2 indicator is contained in the RLF report received by the access device and the value is 1, the access device may determine that the UE detects that the serving cell satisfies the inter-system A2 event before detecting the RLF or the UE has reported the inter-system A2 event before detecting the RLF, and so on.

In another embodiment of the present invention, the RLF report reported by the UE may further carry a first duration indication, wherein the first duration indication is used for indicating the length of time between reporting the A2 event and detecting the RLF by the UE, or the first duration indication is used for indicating the length of time between detecting that the serving cell satisfies the A2 event and detecting the RLF by the UE.

Correspondingly, the access device may receive the RLF report; if the RLF report carries the A2 event indication recorded by the UE, the access device may count the RLF event(s) relevant to the A2 threshold according to the A2 event indication recorded by the UE. For example, if the A2 event indication recorded by the UE indicates that the UE does not detect that the serving cell satisfies the inter-frequency A2 event before detecting the RLF, occurrence of the RLF event(s) relevant to the inter-frequency A2 threshold may be counted once by the access device; or if the A2 event indication recorded by the UE indicates that the UE does not detect that the serving cell satisfies the inter-system A2 event before detecting the RLF, occurrence of the RLF event(s) relevant to the inter-system A2 threshold may be counted once by the access device.

As another example, if the RLF report also carries a first duration indication; wherein the first duration indication is used for indicating the length of time between reporting the A2 event and detecting the RLF by the UE, or the first duration indication is used for indicating the length of time between detecting that the serving cell satisfies the A2 event and detecting the RLF by the UE. Thus, if the A2 event indication recorded by the UE indicates that the UE detects that the serving cell does not satisfy the inter-frequency A2 event before detecting the RLF, occurrence of the RLF event(s) relevant to the inter-frequency A2 threshold is counted once by the access device; or if the A2 event indication recorded by the UE indicates that the UE detects that the serving cell does not satisfy the inter-system A2 event before detecting the RLF, occurrence of the RLF event(s) relevant to the inter-system A2 threshold may be counted once by the access device; if the A2 event indication recorded by the UE indicates that the UE detects that the serving cell satisfies the inter-frequency A2 event before detecting the RLF, and the length of time indicated by the first duration indication is smaller than a first duration threshold, occurrence of the RLF event(s) relevant to the inter-frequency A2 threshold may be counted once by the access device; and if the A2 event indication recorded by the UE indicates that the UE detects that the serving cell satisfies the inter-system A2 event before detecting the RLF, and the length of time indicated by the first duration indication is smaller than the first duration threshold, occurrence of the RLF event(s) relevant to the inter-system A2 threshold may be counted once by the access device.

In addition, the RLF report generated by the UE may also carry cell information of an inter-system cell in which the UE selects to reside after detecting the RLF, or cell information of an inter-system target cell for which the UE encounters handover failure, or cell information of an inter-system target cell for which the UE encounters HOF and cell information of an inter-system cell in which the UE resides after encountering the HOF. Of course, the RLF report may also carry some other information carried in the existing RLF report.

Wherein, since the UE may select an intra-system cell or an inter-system cell (if any) during cell selection after the RLF or the HOF, and if the UE selects the intra-system cell, then the UE may initiate a reconstruction attempt in the selected intra-system cell. In the presence of an inter-system case, the UE may select to reside in a certain inter-system cell after the RLF or the HOF, therefore, it may be considered to add such inter-system cell information in the RLF report, for example, a cell identifier, radio access technology (RAT, Radio Access Technology) type information and the like of the inter-system cell are added in the RLF report.

For example, if the UE selects to reside in other inter-system cell, after the UE detects the RLF in an LTE cell or undergoes handover failure in the LTE system (namely, inter-cell handover failure in the same system) or undergoes inter-system inter-cell handover failure (namely, inter-cell handover failure in different systems), cell information of the inter-system cell which is resided may be recorded in the RLF report generated by the UE, wherein the cell information of the inter-system cell which is resided may, for example, include: a physical cell identity (PCI, Physical Cell Identity) of the inter-system cell which is resided, cell working frequency (frequency) and RAT type of the inter-system cell which is resided; or may include an evolved cell global identifier (ECGI, Evolved Cell Global Identifier) of the inter-system cell which is resided, the RAT type of the inter-system cell which is resided, and the like.

If the handover from the LTE cell to the inter-system target cell of the UE is failed, cell information of the inter-system target cell for which handover failure is encountered may be recorded in the RLF report generated by the UE, wherein the cell information of the inter-system target cell may include, for example: a physical cell identity (PCI) of the inter-system target cell, cell working frequency and RAT type of the inter-system target cell; or may include the ECGI of the inter-system target cell, the RAT type of the inter-system target cell, and the like.

Correspondingly, after the access device receives the RLF report, if the RLF report carries the cell information of the inter-system cell in which the UE selects to reside after detecting the RLF, or the cell information of the inter-system target cell for which the UE encounters the handover failure, or the cell information of the inter-system target cell for which the UE encounters the handover failure and the cell information of the inter-system cell in which the UE resides after encountering the HOF, the access device, according to the information carried in the RLF report, may implement operations such as counting the number of abnormal cell handover(s), and the like.

An embodiment of the method for statistically processing an abnormal event of the present invention may include: an access device receives a radio link failure report; and counts RLF event(s) relevant to an A2 threshold according to an A2 event indication, if the radio link failure report carries the A2 event indication recorded by UE.

Figure 2:
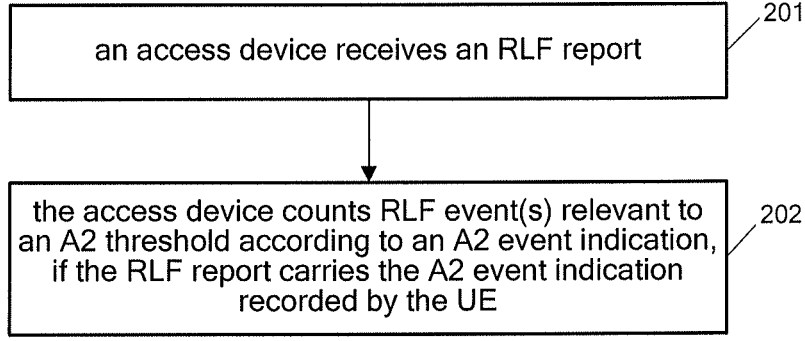
FIG. 2 is a schematic flowchart illustrating a method for statictically processing an abnormal event provided by an embodiment of the present invention.

Referring to FIG. 2, the method for statistically processing an abnormal event provided by an embodiment of the present invention, may include the following contents.

201. an access device receives an RLF report;

wherein, the access device may directly receive the RLF report reported by a UE or receive the RLF report reported by the UE which is forwarded by other access device.

202. the access device counts RLF event(s) relevant to an A2 threshold according to an A2 event indication, if the RLF report carries the A2 event indication recorded by the UE.

Thus, in the present embodiment, if the RLF report carries the A2 event indication recorded by the UE, the access device counts the RLF event(s) relevant to the A2 threshold according to the A2 event indication in the RLF report, and the access device subsequently utilizes the statistical data as an effective basis of optimizing the A2 threshold, so as to benefit the access device to obtain a better A2 threshold optimization effect.

In an embodiment of the present invention, if the A2 event indication recorded by the UE is carried in the RLF report and indicates that the UE does not detect that a serving cell satisfies an inter-frequency A2 event before detecting RLF, occurrence of the RLF event(s) relevant to an inter-frequency A2 threshold may be counted once by the access device; or if the A2 event indication recorded by the UE is carried in the RLF report and indicates that the UE does not detect that a serving cell satisfies an inter-system A2 event before detecting RLF, occurrence of the RLF event(s) relevant to an inter-system A2 threshold may be counted once by the access device.

In another embodiment of the present invention, the RLF report also carries a first duration indication, wherein the first duration indication is used for indicating the length of time between reporting an A2 event and detecting RLF by the UE, or the first duration indication is used for indicating the length of time between detecting that a serving cell satisfies an A2 event and detecting RLF by the UE; if the A2 event indication recorded by the UE is carried in the RLF report and indicates that the UE does not detect that a serving cell satisfies an inter-frequency A2 event before detecting RLF, occurrence of the RLF event(s) relevant to an inter-frequency A2 threshold may be counted once by the access device; or, if the A2 event indication indicates that the UE detects that a serving cell satisfies an inter-frequency A2 event before detecting RLF, and the length of time indicated by the first duration indication is smaller than a first duration threshold (wherein the first duration threshold may be specifically preset according to a specific scenario), occurrence of the RLF event(s) relevant to an inter-frequency A2 threshold may be counted once by the access device; or, if the A2 event indication recorded by the UE is carried in the RLF report and indicates that the UE does not detect that a serving cell satisfies an inter-system A2 event before detecting RLF, occurrence of the RLF event(s) relevant to an inter-system A2 threshold may be counted once by the access device; or, if the A2 event indication indicates that the UE detects that a serving cell satisfies an inter-system A2 event before detecting RLF, and the length of time indicated by the first duration indication is smaller than a first duration threshold, occurrence of the RLF event(s) relevant to an inter-system A2 threshold may be counted once by the access device.

Further, if the occurrence number of the RLF event(s) relevant to the inter-frequency A2 threshold counted within at least one statistical period exceeds a preset first number threshold (or, if the ratio of the occurrence number of the RLF event(s) relevant to the inter-frequency A2 threshold counted within at least one statistical period, with respect to the total number of abnormal handover(s) counted within the at least one statistical period, exceeds a preset first proportion threshold), the inter-frequency A2 threshold may be adjusted (increased or decreased). Or, if the occurrence number of the RLF event(s) relevant to the inter-system A2 threshold counted within at least one statistical period exceeds a preset second number threshold (or, if the ratio of the occurrence number of the RLF event(s) relevant to the inter-system A2 threshold counted within at least one statistical period, with respect to the total number of abnormal handover(s) counted within the at least one statistical period, exceeds a preset second proportion threshold), the access device may adjust (increase or decrease) the inter-system A2 threshold, wherein the first number threshold and the second number threshold are equal or unequal, and the first proportion threshold and the second proportion threshold are equal or unequal. Wherein, there are several different ways for the access device to adjust (for example, increase or decrease) the inter-frequency/inter-system A2 threshold, for example, the access device may adjust the inter-frequency/inter-system A2 threshold in a stepping manner, the stepping amplitude of adjusting the inter-frequency/inter-system A2 threshold may be set according to a specific scenario (wherein, for example, the stepping amplitude may be corresponding to the proportion of the occurrence number of the RLF event(s) relevant to the inter-frequency/inter-system A2 threshold in the occurrence number of all RLF event(s)), and the stepping amplitude of adjusting (e.g., increasing or decreasing) the inter-frequency/inter-system A2 threshold at each time may be equal or unequal.

In another embodiment of the present invention, if the received RLF report also carries cell information of an inter-system cell in which the UE selects to reside after detecting RLF, or the RLF report carries cell information of an inter-system target cell for which the UE encounters handover failure, or the RLF report carries cell information of an inter-system target cell for which the UE encounters HOF and cell information of an inter-system cell in which the UE reside after encountering the HOF, then the access device may count the number of abnormal cell handover(s) according to the information carried in the RLF report.

For instance, if the received RLF report also carries the cell information of the inter-system cell in which the UE selects to reside after detecting the RLF, and the RLF report also carries an RLF identifier, cell information of a cell from which a handover command is received by the UE for the last time, cell information of a cell in which the UE detects the RLF, reference signal receiving power (RSRP) values of a serving cell and a neighboring cell capable of being detected by the UE, and a second duration indication, wherein the second duration indication is used for indicating the length of time between receiving the handover command and detecting the RLF by the UE; the length of time indicated by the second duration indication is larger than a preset second duration threshold, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), then late handover from the cell in which the RLF is detected to the inter-system cell which is selected to reside after the RLF may be counted once by the access device. Wherein, if the RLF report also carries an A2 event indication (the A2 event indication indicates that the UE does not detect that a serving cell satisfies an inter-system A2 event before detecting the RLF, or the A2 event indication indicates that the UE does not report an inter-system A2 event, shown that the abnormal handover is relevant to an A2 threshold, before detecting the RLF), then late handover relevant to the A2 threshold from the cell in which the RLF is detected to the inter-system cell which is selected to reside after the RLF may be counted once by the access device.

As another example, if the RLF report received by the access device also carries the cell information of the inter-system target cell for which the UE encounters the HOF, and the RLF report also carries an HOF identifier, RSPR values of a serving cell and a neighboring cell capable of being detected by the UE, cell information of a cell (namely, a corresponding source cell of HOF) from which a handover command is received by the UE for the last time and cell information of a reconstruction attempt cell of the UE; wherein the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), and the reconstruction attempt cell is the same as the cell from which the handover command is received for the last time, then early handover from the cell from which the handover command is received for the last time to the inter-system target cell is counted once.

As another example, if the RLF report received by the access device also carries the cell information of the inter-system cell in which the UE selects to reside after detecting the RLF, and the RLF report also carries an RLF identifier, cell information of a cell from which a handover command is received by the UE for the last time, cell information of a cell in which the UE detects the RLF, cell information of a reconstruction attempt cell of the UE, RSRP values of a serving cell and a neighboring cell capable of being detected by the UE, and a second duration indication, wherein the second duration indication is used for indicating the length of time between receiving the handover command and detecting the RLF by the UE; and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), the length of time indicated by the second duration indication is smaller than a preset second duration threshold, and the inter-system cell in which the UE selects to reside after detecting the RLF is different from the cell from which the handover command is received for the last time, then incorrect handover from the cell from which the handover command is received for the last time to the cell in which the RLF is detected is counted once by the access device.

As another example, if the RLF report received by the access device also carries the cell information of the inter-system target cell for which the UE encounters the HOF and the cell information of the inter-system cell in which the UE resides after encountering the HOF, and the RLF report also carries an HOF identifier, cell information of a cell from which a handover command is received by the UE for the last time, and RSRP values of a serving cell and a neighboring cell capable of being detected by the UE; wherein, the inter-system target cell is different from the inter-system cell in which the UE resides after encountering the HOF, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), then incorrect handover from the cell from which the handover command is received for the last time to the inter-system target cell is counted once by the access device.

Further, if the proportion of, the number of abnormal handover(s) relevant to the A2 threshold from the cell in which the RLF is detected to the inter-system cell, counted by the access device within at least one statistical period, with respect to the total number of abnormal handover(s) from the cell in which the RLF is detected to the inter-system cell, counted within the at least one statistical period, exceeds a preset value, then the inter-system A2 threshold may be adjusted (increased or decreased). Or, if the number of abnormal handover(s) relevant to the A2 threshold from the cell in which the RLF is detected to the inter-system cell, with respect to the total number of abnormal handover(s) from the cell in which the RLF is detected to the inter-system cell, counted by the access device within at least one statistical period, exceeds a preset value, then the inter-system A2 threshold may be adjusted (increased or decreased). For example, if the proportion of the number of early handover(s) relevant to the A2 threshold, with respect to the number of abnormal handover(s) from the cell in which the RLF is detected to the inter-system cell, counted within at least one statistical period, exceeds a preset value, then the inter-system A2 threshold may be decreased; or if the proportion of the number of late handover(s) relevant to the A2 threshold, with respect to the number of abnormal handover(s) from the cell in which the RLF is detected to the inter-system cell, counted within at least one statistical period, exceeds a preset value, then the access device may increase the inter-system A2 threshold. Wherein, there are several different ways for the access device to adjust (increase or decrease) the inter-system A2 threshold, for example, the access device may adjust the inter-system A2 threshold in a stepping manner, the stepping amplitude of adjusting the inter-system A2 threshold may be preset according to a specific scenario, and the stepping amplitude of adjusting (e.g., increasing or decreasing) the inter-system A2 threshold at each time may be equal or unequal.

In another embodiment of the method for processing an RLF report of the present invention, the method may include: a UE generates an RLF report, wherein the RLF report carries cell information of an inter-system cell in which the UE selects to reside after detecting RLF, or the RLF report carries cell information of an inter-system target cell for which the UE encounters handover failure; and the UE reports the RLF report.

Figure 3:
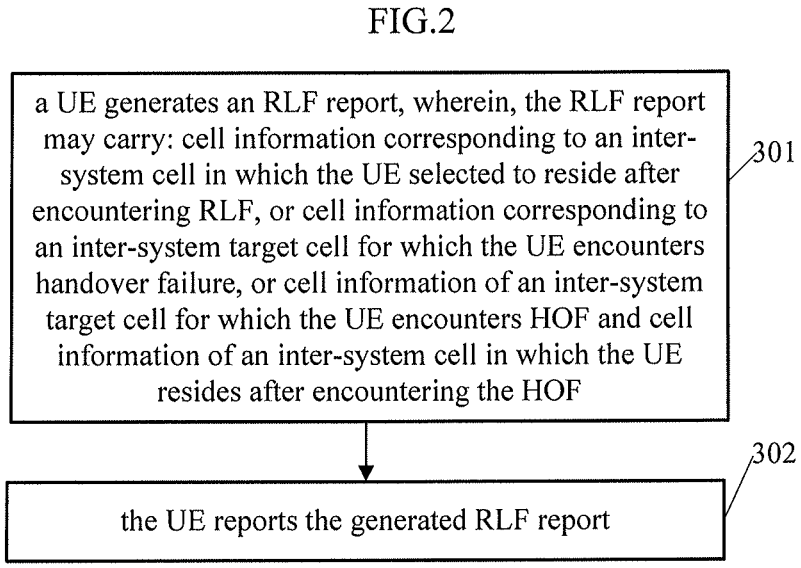
FIG. 3 is a schematic flowchart illustrating another method for processing an RLF report provided by an embodiment of the present invention.

Referring to FIG. 3, another method for processing an RLF report is provided by an embodiment of the present invention, may include the following contents:

301. a UE generates an RLF report;

wherein, the RLF report generated by the UE may carry cell information of an inter-system cell in which the UE selects to reside after detecting RLF, or the RLF report carries cell information of an inter-system target cell for which the UE encounters handover failure, or the RLF report carries cell information of an inter-system target cell for which the UE encounters HOF and cell information of an inter-system cell in which the UE resides after encountering the HOF, and the like; of course, the RLF report may also carry other information carried in the existing RLF report.

302. the UE reports the generated RLF report.

Thus, in the present embodiment, the RLF report generated and reported by the UE carries the cell information of the inter-system cell in which the UE selects to reside after detecting the RLF, or the RLF report carries the cell information of the inter-system target cell for which the UE encounters handover failure, or the RLF report carries cell information of the inter-system target cell for which the HOF is encountered and the cell information of the inter-system cell in which the UE resides after encountering the HOF, then the access device may count abnormal handover event(s) between inter-system cells according to the cell information of the inter-system cells in the RLF report, to provide an effective basis for operations of the access device, such as optimizing handover parameters (e.g., A2 threshold or the like) between the inter-system cells, and the like, so as to benefit the access device to obtain a better optimization effect of the handover parameters between the inter-system cells.

Wherein, since the UE may select an intra-system cell or an inter-system cell (if any) during cell selection after the RLF or the HOF, and if the UE selects the intra-system cell, then the UE may initiate a reconstruction attempt in the selected intra-system cell. In the presence of an inter-system case, the UE may select to reside in a certain inter-system cell after the RLF or the HOF, therefore, it may be considered to add such inter-system cell information in the RLF report, for example, a cell identifier, radio access technology (RAT, Radio Access Technology) type information and the like of the inter-system cell are added in the RLF report.

For example, if the UE selects to reside in other inter-system cell, after the UE detects the RLF in an LTE cell or undergoes handover failure in the LTE system (namely, inter-cell handover failure in the same system) or undergoes inter-system inter-cell handover failure (namely, inter-cell handover failure in different systems), cell information of the inter-system cell which is resided may be recorded in the RLF report generated by the UE, wherein the cell information of the inter-system cell which is resided may, for example, include: a cell identity of the inter-system cell which is resided, cell working frequency and RAT type of the inter-system cell which is resided; or may include an evolved cell global identifier (ECGI) of the inter-system cell which is resided, the RAT type of the inter-system cell which is resided, and the like.

If the handover from the LTE cell to the inter-system target cell of the UE is failed, cell information of the inter-system target cell for which handover failure is encountered may be recorded in the RLF report generated by the UE, wherein the cell information of the inter-system target cell may include, for example: a cell identifier of the inter-system target cell, cell working frequency and RAT type of the inter-system resident cell; or may include the ECGI of the inter-system target cell, the RAT type of the inter-system target cell, and the like.

For instance, if the RLF report generated by the UE carries the cell information (may be called ECGI4&RAT) of the inter-system cell in which the UE selects to reside after detecting the RLF, then the RLF report may also carry: an RLF identifier, cell information (may include previousPCellId) of a cell from which a handover command is received by the UE for the last time, cell information (may include failedPCellId) of a cell in which the UE detects the RLF, RSRP values of a serving cell and a neighboring cell capable of being detected by the UE, and a second duration indication (e.g. timeConnFailure), wherein the second duration indication is used for indicating the length of time between receiving the handover command and detecting the RLF. Of course, the RLF report may also carry other information carried in the existing RLF report.

As another example, if the RLF report generated by the UE carries the cell information (may include ECGI5&RAT) of the inter-system target cell for which the UE encounters the HOF, then the RLF report may also carry: an HOF identifier, RSRP values of a serving cell and a neighboring cell capable of being detected by the UE, cell information of a cell (namely, a corresponding source cell of HOF) from which a handover command is received by the UE for the last time and cell information of a reconstruction attempt cell of the UE. Of course, the RLF report may also carry other information carried in the existing RLF report.

As another example, if the RLF report generated by the UE carries the cell information of the inter-system cell in which the UE selects to reside after detecting the RLF, then the RLF report may also carry: an RLF identifier, cell information of a cell from which a handover command is received by the UE for the last time, cell information of a cell in which the UE detects the RLF, cell information of a reconstruction attempt cell of the UE, RSRP values of a serving cell and a neighboring cell capable of being detected by the UE, and a second duration indication, wherein the second duration indication is used for indicating the length of time between receiving the handover command and detecting the RLF. Of course, the RLF report may also carry other information carried in the existing RLF report.

As another example, if the RLF report generated by the UE carries the cell information of the inter-system target cell for which the UE encounters the HOF and the cell information of the inter-system cell in which the UE resides after encountering the HOF, then the RLF report may also carry: an HOF identifier, cell information of a cell from which a handover command is received by the UE for the last time, and RSPR values of a serving cell and a neighboring cell capable of being detected by the UE. Of course, the RLF report may also carry other information carried in the existing RLF report.

Correspondingly, after receiving the RLF report, if the RLF report carries the cell information of the inter-system cell in which the UE selects to reside after detecting the RLF, or the cell information of the inter-system target cell for which the UE encounters the handover failure, then, the access device may count the number of abnormal cell handover(s) according to the information carried in the RLF report.

For instance, if the RLF report received by the access device carries: the cell information of the inter-system cell in which the UE selects to reside after detecting the RLF, and the RLF report also carries an RLF identifier, cell information of a cell from which a handover command is received by the UE for the last time, cell information of a cell in which the UE detects the RLF, reference signal receiving power (RSRP) values of a serving cell and a neighboring cell capable of being detected by the UE, and a second duration indication, wherein the second duration indication is used for indicating the length of time between receiving the handover command and detecting the RLF by the UE; and moreover, the length of time indicated by the second duration indication is larger than a preset second duration threshold, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), then late handover from the cell in which the RLF is detected to the inter-system cell which is selected to reside after the RLF may be counted once by the access device. Wherein, if the RLF report also carries an A2 event indication (the A2 event indication indicates that the UE does not detect that a serving cell satisfies an inter-system A2 event before detecting the RLF, or the A2 event indication indicates that the UE does not report an inter-system A2 event, shown that the abnormal handover is relevant to an A2 threshold, before detecting the RLF), then late handover relevant to the A2 threshold from the cell in which the RLF is detected to the inter-system cell which is selected to reside after the RLF may be counted once by the access device.

As another example, if the RLF report received by the access device carries the cell information of the inter-system target cell for which the UE encounters the HOF, and the RLF report also carries an HOF identifier, RSPR values of a serving cell and a neighboring cell capable of being detected by the UE, cell information of a cell (namely, a corresponding source cell of HOF) from which a handover command is received by the UE for the last time and cell information of a reconstruction attempt cell of the UE; wherein the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), and the reconstruction attempt cell is the same as the cell from which the handover command is received for the last time, then early handover from the cell from which the handover command is received for the last time to the inter-system target cell is counted once.

As another example, if the RLF report received by the access device carries the cell information of the inter-system cell in which the UE selects to reside after detecting the RLF, and the RLF report also carries an RLF identifier, cell information of a cell from which a handover command is received by the UE for the last time, cell information of a cell in which the UE detects the RLF, cell information of a reconstruction attempt cell of the UE, RSRP values of a serving cell and a neighboring cell capable of being detected by the UE, and a second duration indication, wherein the second duration indication is used for indicating the length of time between receiving the handover command and detecting the RLF by the UE; and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), the length of time indicated by the second duration indication is smaller than a preset second duration threshold, and the inter-system cell in which the UE selects to reside after detecting the RLF is different from the cell from which the handover command is received for the last time, then incorrect handover from the cell from which the handover command is received for the last time to the cell in which the RLF is detected may be counted once by the access device.

As another example, if the RLF report received by the access device carries the cell information of the inter-system target cell for which the UE encounters the HOF and the cell information of the inter-system cell in which the UE resides after encountering the HOF, and the RLF report also carries an HOF identifier, cell information of a cell from which a handover command is received by the UE for the last time, and RSRP values of a serving cell and a neighboring cell capable of being detected by the UE; wherein, the inter-system target cell is different from the inter-system cell in which the UE resides after encountering the HOF, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), then incorrect handover from the cell from which the handover command is received for the last time to the inter-system target cell may be counted once by the access device.

In an embodiment of the present invention, the RLF identifier or the HOF identifier carried in the RLF report may, for example, be carried in a link failure type field of the RLF report.

Further, if the proportion of, the number of abnormal handover(s) relevant to the A2 threshold from the cell in which the RLF is detected to the inter-system cell, counted by the access device within at least one statistical period, with respect to the total number of abnormal handover(s) from the cell in which the RLF is detected to the inter-system cell, counted within the at least one statistical period, exceeds a preset value, then the inter-system A2 threshold may be adjusted (increased or decreased). Or, if the number of abnormal handover(s) relevant to the A2 threshold from the cell in which the RLF is detected to the inter-system cell, with respect to the total number of abnormal handover(s) from the cell in which the RLF is detected to the inter-system cell, counted by the access device within at least one statistical period, exceeds a preset value, then the inter-system A2 threshold may be adjusted (increased or decreased). For example, if the proportion of the number of early handover(s) relevant to the A2 threshold, with respect to the number of abnormal handover(s) from the cell in which the RLF is detected to the inter-system cell, counted within at least one statistical period, exceeds a preset value, then the inter-system A2 threshold may be decreased; or if the proportion of the number of late handover(s) relevant to the A2 threshold, with respect to the number of abnormal handover(s) from the cell in which the RLF is detected to the inter-system cell, counted within at least one statistical period, exceeds a preset value, then the access device may increase the inter-system A2 threshold. Wherein, there are several different ways for the access device to adjust (increase or decrease) the inter-system A2 threshold, for example, the access device may adjust the inter-system A2 threshold in a stepping manner, the stepping amplitude of adjusting the inter-system A2 threshold may be preset according to a specific scenario, and the stepping amplitude of adjusting (e.g., increasing or decreasing) the inter-system A2 threshold at each time may be equal or unequal.

An embodiment of the method for statistically processing an abnormal event of the present invention, may include: an access device receives a radio link failure report; and if the radio link failure report carries an A2 event indication recorded by a UE, RLF event(s) relevant to an A2 threshold are counted according to the A2 event indication.

Referring to FIG. 4, a method for statistically processing an abnormal event provided by an embodiment of the present invention, may include the following contents:

401. an access device receives an RLF report;

wherein, the access device may directly receive the RLF report reported by a UE, or receive the RLF report reported by the UE which is forwarded by other access device.

402. If the RLF report carries cell information of an inter-system cell in which a UE selects to reside after detecting RLF, or carries cell information of an inter-system target cell for which a UE encounters handover failure, or the RLF report carries cell information of an inter-system target cell for which HOF is encountered and cell information of an inter-system cell in which a UE resides after encountering the HOF, then the access device counts the number of abnormal cell handover(s) according to information carried in the RLF report.

Thus, in the present embodiment, if the RLF report carries the cell information of the inter-system cell in which the UE selects to reside after detecting the RLF, or the RLF report carries the cell information of the inter-system target cell for which the UE encounters handover failure, or the RLF report carries the cell information of the inter-system target cell for which HOF is encountered and the cell information of the inter-system cell in which the UE resides after encountering the HOF, then the access device may count the number of abnormal cell handover(s) according to the information carried in the RLF report, and the access device subsequently utilizes the statistical data as an effective basis for optimizing handover parameters (e.g., A2 threshold or the like) between the inter-system cells, so as to benefit the access device to obtain a better optimization effect of the handover parameters between the inter-system cells.

Wherein, since the UE may select an intra-system cell or an inter-system cell (if any) during cell selection after the RLF or the HOF, and if the UE selects the intra-system cell, then the UE may initiate a reconstruction attempt in the selected intra-system cell. In the presence of an inter-system case, the UE may select to reside in a certain inter-system cell after the RLF or the HOF, therefore, it may be considered to add such inter-system cell information in the RLF report, for example, the cell identifier, radio access technology (RAT, Radio Access Technology) type information and the like of the inter-system cell are added in the RLF report.

For example, if the UE selects to reside in other inter-system cell, after the UE detects the RLF in an LTE cell or undergoes handover failure in the LTE system (namely, inter-cell handover failure in the same system) or undergoes inter-system inter-cell handover failure (namely, inter-cell handover failure in different systems), cell information of the inter-system cell which is resided may be recorded in the RLF report generated by the UE, wherein the cell information of the inter-system cell which is resided may, for example, include: a cell identifier of the inter-system cell which is resided, cell working frequency and RAT type of the inter-system cell which is resided; or may include an evolved cell global identifier (ECGI) of the inter-system cell which is resided, the RAT type of the inter-system cell which is resided, and the like.

If the handover from the LTE cell to the inter-system target cell of the UE is failed, cell information of the inter-system target cell for which handover failure is encountered may be recorded in the RLF report generated by the UE, wherein the cell information of the inter-system target cell may include, for example: a cell identifier of the inter-system target cell, cell working frequency and RAT type of the inter-system resident cell; or may include the ECGI of the inter-system target cell, the RAT type of the inter-system target cell, and the like.

For instance, if the RLF report received by the access device carries the cell information of the inter-system cell in which the UE selected to reside after detecting the RLF, and the RLF report also carries an RLF identifier, cell information of a cell from which a handover command is received by the UE for the last time, cell information of a cell in which the UE detects the RLF, reference signal receiving power (RSRP) values of a serving cell and a neighboring cell capable of being detected by the UE, and a second duration indication, wherein the second duration indication is used for indicating the length of time between receiving the handover command and detecting the RLF by the UE; the length of time indicated by the second duration indication is larger than a preset second duration threshold, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), then late handover from the cell in which the RLF is detected to the inter-system cell which is selected to reside after the RLF may be counted once by the access device. Wherein, if the RLF report also carries an A2 event indication (the A2 event indication indicates that the UE does not detect that a serving cell satisfies an inter-system A2 event before detecting the RLF, or the A2 event indication indicates that the UE does not report an inter-system A2 event shown that the abnormal handover is relevant to an A2 threshold, before detecting the RLF), then late handover relevant to the A2 threshold from the cell in which the RLF is detected to the inter-system cell which is selected to reside after the RLF may be counted once by the access device.

As another example, if the RLF report received by the access device carries the cell information of the inter-system target cell for which the UE encounters the HOF, and the RLF report also carries an HOF identifier, RSPR values of a serving cell and a neighboring cell capable of being detected by the UE, cell information of a cell (namely, a corresponding source cell of HOF) from which a handover command is received by the UE for the last time and cell information of a reconstruction attempt cell of the UE, wherein the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), and the reconstruction attempt cell is the same as the cell from which the handover command is received for the last time, then early handover from the cell from which the handover command is received for the last time to the inter-system target cell is counted once.

As another example, if the RLF report received by the access device carries the cell information of the inter-system cell in which the UE selects to reside after detecting the RLF, and the RLF report also carries an RLF identifier, cell information of a cell from which a handover command is received by the UE for the last time, cell information of a cell in which the UE detects the RLF, cell information of a reconstruction attempt cell of the UE, RSRP values of a serving cell and a neighboring cell capable of being detected by the UE, and a second duration indication, wherein the second duration indication is used for indicating the length of time between receiving the handover command and detecting the RLF by the UE; and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), the length of time indicated by the second duration indication is smaller than a preset second duration threshold, and the inter-system cell in which the UE selects to reside after detecting the RLF is different from the cell from which the handover command is received for the last time, then incorrect handover from the cell from which the handover command is received for the last time to the cell in which the RLF is detected may be counted once by the access device.

As another example, if the RLF report received by the access device carries the cell information of the inter-system target cell for which the UE encounters the HOF and the cell information of the inter-system cell in which the UE resides after encountering the HOF, and the RLF report also carries an HOF identifier, cell information of a cell from which a handover command is received by the UE for the last time, and RSRP values of a serving cell and a neighboring cell capable of being detected by the UE; wherein, the inter-system target cell is different from the inter-system cell in which the UE resides after encountering the HOF, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), then incorrect handover from the cell from which the handover command is received by the UE for the last time to the inter-system target cell may be counted once by the access device.

Further, if the proportion of, the number of abnormal handover(s) relevant to the A2 threshold from the cell in which the RLF is detected to the inter-system cell, counted by the access device within at least one statistical period, with respect to the total number of abnormal handover(s) from the cell in which the RLF is detected to the inter-system cell, counted within the at least one statistical period, exceeds a preset value, then the inter-system A2 threshold may be adjusted (increased or decreased). Or, if the number of abnormal handover(s) relevant to the A2 threshold from the cell in which the RLF is detected to the inter-system cell, with respect to the total number of abnormal handover(s) from the cell in which the RLF is detected to the inter-system cell, counted by the access device within the at least one statistical period, exceeds a preset value, then the inter-system A2 threshold may be adjusted (increased or decreased). For example, if the proportion of the number of early handover(s) relevant to the A2 threshold, with respect to the number of abnormal handover(s) from the cell in which the RLF is detected to the inter-system cell, counted within at least one statistical period, exceeds a preset value, then the inter-system A2 threshold may be decreased; or if the proportion of the number of late handover(s) relevant to the A2 threshold, with respect to the number of abnormal handover(s) from the cell in which the RLF is detected to the inter-system cell, counted within at least one statistical period, exceeds a preset value, then the access device may increase the inter-system A2 threshold. Wherein, there are several different ways for the access device to adjust (increase or decrease) the inter-system A2 threshold, for example, the access device may adjust the inter-system A2 threshold in a stepping manner, the stepping amplitude of adjusting the inter-system A2 threshold may be preset according to a specific scenario, and the stepping amplitude of adjusting (e.g., increasing or decreasing) the inter-system A2 threshold at each time may be equal or unequal.

It should be noted that, for simple description, the foregoing embodiments of a method are expressed as a series of action combinations, but those skilled in the art should be aware that the present invention is not limited to the sequence of the described actions, because according to the present invention, certain steps may be implemented in other sequences or simultaneously. Secondly, those skilled in the art should also be aware that the embodiments described in the specification all belong to preferred embodiments, and the involved actions and units are not necessarily required by the present invention.

For bettering understanding and implementation of the above-mentioned solutions of the embodiments of the prevent invention, relevant apparatuses used for implementing the above-mentioned solutions are further provided below.

Referring to FIG. 5, a user equipment 500 provided in an embodiment of the present invention may include: a generating unit 510 and a transmitter 520.

Wherein, the generating unit 510 is configured to generate a radio link failure report; the radio link failure report carries an A2 event indication recorded by the user equipment. The transmitter 520 is configured to report the radio link failure report generated by the generating unit 510.

In an application scenario, the A2 event indication recorded by the user equipment 500 may be used for indicating that, the user equipment 500 does not detect that a serving cell satisfies an inter-frequency A2 event before detecting RLF or the user equipment 500 does not report an inter-frequency A2 event before detecting RLF; or the A2 event indication is used for indicating that, the user equipment 500 detects that a serving cell satisfies an inter-frequency A2 event before detecting RLF or the user equipment 500 has reported an inter-frequency A2 event before detecting RLF; or the A2 event indication is used for indicating that the user equipment 500 does not detect that a serving cell satisfies an inter-system A2 event before detecting RLF or the user equipment 500 does not report an inter-system A2 event before detecting RLF; or the A2 event indication is used for indicating that the user equipment 500 detects that a serving cell satisfies an inter-system A2 event before detecting RLF or the user equipment 500 has reported an inter-system A2 event before detecting RLF.

In an application scenario, the radio link failure report generated by the generating unit 510 also carries a first duration indication, wherein the first duration indication is used for indicating the length of time between reporting an A2 event and detecting RLF by the user equipment 500, or the first duration indication is used for indicating the length of time between detecting that a serving cell satisfies an A2 event and detecting RLF by the user equipment 500.

In another embodiment of the present invention, the radio link failure report generated by the generating unit 510 may also carry: cell information of an inter-system cell in which the user equipment 500 selected to reside after detecting RLF, or cell information of an inter-system target cell for which the user equipment 500 encounters handover failure HOF, or cell information of an inter-system target cell for which the user equipment 500 encounters HOF and cell information of an inter-system cell in which the user equipment 500 resides after encountering the HOF.

It should be appreciated that, the user equipment 500 in the present embodiment may be the user equipment in the above-mentioned embodiments of a method, the functions of the functional units thereof may be specifically implemented according to the methods in the above-mentioned embodiments of a method, and the specific implementation process may refer to relevant descriptions in the above-mentioned embodiments of a method, and will not be described redundantly herein.

Referring to FIG. 6-a, an access device 600 provided in an embodiment of the present invention may include: a receiver 610 and a counting unit 620.

Wherein, the above-mentioned receiver 610 is configured to receive a radio link failure report; and the above-mentioned counting unit 620 is configured to count RLF event(s) relevant to an A2 threshold according to an A2 event indication, if the radio link failure report received by the receiver 610 carries the A2 event indication recorded by a user equipment.

In an application scenario, the counting unit 620 is configured to count, specifically, occurrence of the RLF event(s) relevant to an inter-frequency A2 threshold is counted once, if the A2 event indication carried in the RLF report and recorded by the UE indicates that the UE does not detect that a serving cell satisfies an inter-frequency A2 event before detecting RLF; or occurrence of the RLF event(s) relevant to an inter-system A2 threshold is counted once, if the A2 event indication carried in the RLF report and recorded by the UE indicates that the UE does not detect that a serving cell satisfies an inter-system A2 event before detecting RLF.

In an application scenario, if the RLF reported received by the receiver 610 also carries a first duration indication, wherein the first duration indication is used for indicating the length of time between reporting an A2 event and detecting RLF by the UE, or the first duration indication is used for indicating the length of time between detecting that a serving cell satisfies an A2 event and detecting RLF by the UE;

the counting unit 620 is configured to count, specifically, occurrence of the RLF event(s) relevant to an inter-frequency A2 threshold is counted once, if the A2 event indication carried in the RLF report and recorded by the UE indicates that the UE does not detect that the serving cell satisfies an inter-frequency A2 event before detecting the RLF; or, occurrence of the RLF event(s) relevant to an inter-frequency A2 threshold is counted once, if the A2 event indication indicates that the UE detects that the serving cell satisfies an inter-frequency A2 event before detecting the RLF, and the length of time indicated by the first duration indication is smaller than a first duration threshold (wherein the first duration threshold may be specifically preset according to a specific scenario); or, occurrence of the RLF event(s) relevant to an inter-system A2 threshold is counted once, if the A2 event indication carried in the RLF report and recorded by the UE indicates that the UE does not detect that the serving cell satisfies an inter-system A2 event before detecting the RLF; or, occurrence of the RLF event(s) relevant to an inter-system A2 threshold is counted once, if the A2 event indication indicates that the UE detects that the serving cell satisfies an inter-system A2 event before detecting the RLF, and the length of time indicated by the first duration indication is smaller than a first duration threshold.

Referring to FIG. 6-b, in an application scenario, the access device 600 may further include:

a parameter adjusting unit 630, is configured to adjust (e.g., increase or decrease) the inter-frequency A2 threshold, if the occurrence number of the RLF event(s) relevant to the inter-frequency A2 threshold counted by the counting unit 620 within at least one statistical period exceeds a preset first number threshold (or, if the ratio of the occurrence number of the RLF event(s) relevant to the inter-frequency A2 threshold counted by the counting unit 620 within at least one statistical period, with respect to the total number of abnormal handover(s) counted within the at least one statistical period, exceeds a preset first proportion threshold). Or, configured to adjust (increase or decrease) the inter-system A2 threshold, if the occurrence number of the RLF event(s) relevant to the inter-system A2 threshold counted by the counting unit 620 within at least one statistical period exceeds a preset second number threshold (or, the ratio of the occurrence number of the RLF event(s) relevant to the inter-system A2 threshold counted by the counting unit 620 within at least one statistical period, with respect to the total number of abnormal handover(s) counted within the at least one statistical period, exceeds a preset second proportion threshold).

Wherein, the first number threshold and the second number threshold are equal or unequal, and the first proportion threshold and the second proportion threshold are equal or unequal. Wherein, there are several different ways for the parameter adjusting unit 630 to adjust (for example, increase or decrease) the inter-frequency/inter-system A2 threshold, for example, the parameter adjusting unit 630 may adjust the inter-frequency/inter-system A2 threshold in a stepping manner, the stepping amplitude of adjusting the inter-frequency/inter-system A2 threshold may be preset according to a specific scenario (wherein, for example, the stepping amplitude may be corresponding to the proportion of the occurrence number of the RLF event(s) relevant to the inter-frequency/inter-system A2 threshold in the occurrence number of all RLF event(s)), and the stepping amplitude of adjusting (e.g., increasing or decreasing) the inter-frequency/inter-system A2 threshold at each time may be equal or unequal.

In an application scenario, the RLF report received by the receiver 610 may also carry cell information of an inter-system cell in which the UE selected to reside after detecting RLF, or the RLF report carries cell information of an inter-system target cell for which the UE encounters handover failure, or the RLF report carries cell information of an inter-system target cell for which the UE encounters HOF and cell information of an inter-system cell in which the UE resides after encountering the HOF.

It should be appreciated that, the access device 600 in the present embodiment may be the access device in the above-mentioned embodiments of a method, the functions of the functional units thereof may be specifically implemented according to the methods in the above-mentioned embodiments of a method, and the specific implementation process may refer to relevant descriptions of the above-mentioned embodiments of a method, and will not be described redundantly herein.

Referring to FIG. 7, a user equipment 700 provided in an embodiment of the present invention may include: a generating unit 710 and a transmitter 720.

Wherein, the above-mentioned generating unit 710 is configured to generate a radio link failure report.

The above-mentioned transmitter 720 is configured to report the radio link failure report generated by the generating unit 710.

The RLF report generated by the above-mentioned generating unit 710 may carry cell information of an inter-system cell in which the user equipment 700 selected to reside after detecting RLF, or the RLF report may carry cell information of an inter-system target cell for which the user equipment 700 encounters handover failure, or the RLF report may carry cell information of an inter-system target cell for which the user equipment 700 encounters HOF and cell information of an inter-system cell in which the user equipment 700 resides after encountering the HOF.

In an application scenario, the RLF report generated by the generating unit 710 may carry the cell information of the inter-system cell in which the user equipment 700 selected to reside after detecting the RLF, and the RLF report may also carry: an RLF identifier, cell information of a cell from which a handover command is received by the user equipment 700 for the last time, cell information of a cell in which the user equipment 700 detects the RLF, reference signal receiving power (RSRP) values of a serving cell and a neighboring cell capable of being detected by the user equipment 700, and a second duration indication, wherein the second duration indication is used for indicating the length of time between receiving the handover command and detecting the RLF by the user equipment 700.

In another application scenario, the RLF report generated by the generating unit 710 may carry the cell information of the inter-system target cell for which the user equipment 700 encounters HOF, and the RLF report may also carry: an HOF identifier, RSPR values of a serving cell and a neighboring cell capable of being detected by the user equipment 700, cell information of a cell from which a handover command is received by the user equipment 700 for the last time and cell information of a reconstruction attempt cell of the user equipment 700.

In another application scenario, the RLF report generated by the generating unit 710 may carry the cell information of the inter-system target cell for which the user equipment 700 encounters the HOF and the cell information of the inter-system cell in which the user equipment 700 resides after encountering the HOF, and the RLF report may also carry: an HOF identifier, cell information of a cell from which a handover command is received by the user equipment 700 for the last time, and RSRP values of a serving cell and a neighboring cell capable of being detected by the user equipment 700.

It should be appreciated that, the user equipment 700 in the present embodiment may be the user equipment in the above-mentioned embodiments of a method, the functions of the functional units thereof may be specifically implemented according to the methods in the above-mentioned embodiments of a method, and the specific implementation process may refer to relevant descriptions of the above-mentioned embodiments of a method, and will not be described redundantly herein.

Referring to FIG. 8-*a*, an access device 800 provided in an embodiment of the present invention may include: a receiver 810 and a counting unit 820.

Wherein, the above-mentioned receiver 810 is configured to receive a radio link failure report.

The above-mentioned counting unit 820 is configured to count the number of abnormal cell handover(s) according to information carried in the radio link failure report, if the radio link failure report received by the receiver 810 carries cell information of an inter-system cell in which a UE selected to reside after detecting RLF, or carries cell information of an inter-system target cell for which the UE encounters handover failure, or carries cell information of an inter-system target cell for which the UE encounters HOF and cell information of an inter-system cell in which the UE resides after encountering the HOF.

In an application scenario, the counting unit 820 may be configured to count, specifically, late handover from a cell in which the RLF is detected to the inter-system cell which is selected to reside after the RLF is counted once, if the RLF report received by the receiver 810 carries the cell information of the inter-system cell in which the UE selected to reside after detecting the RLF, and the RLF report also carries cell information of a cell from which a handover command is received by the UE for the last time, an RLF identifier, cell information of the cell in which the UE detects the RLF, reference signal receiving power (RSRP) values of a serving cell and a neighboring cell capable of being detected by the UE, and a second duration indication, wherein the second duration indication is used for indicating the length of time between receiving the handover command and detecting the RLF by the UE; moreover, the length of time indicated by the second duration indication is larger than a preset second duration threshold, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell). Wherein, if the RLF report also carries an A2 event indication (the A2 event indication indicates that the UE does not detect that the serving cell satisfies an inter-system A2 event before detecting the RLF, or the A2 event indication indicates that the UE does not report an inter-system A2 event, shown that the abnormal handover is relevant to an A2 threshold, before detecting the RLF), then late handover relevant to the A2 threshold from the cell in which the RLF is detected to the inter-system cell which is selected to reside after the RLF may be counted once by the counting unit 820.

In another application scenario, the counting unit 820 is configured to count, specifically, early handover from a cell from which a handover command is received for the last time to the inter-system target cell is counted once, if the RLF report received by the receiver 810 carries the cell information of the inter-system target cell for which the UE encounters the HOF, and the RLF report also carries an HOF identifier, RSPR values of a serving cell and a neighboring cell capable of being detected by the UE, cell information of the cell (namely, a corresponding source cell of HOF) from which the handover command is received by the UE for the last time and cell information of a reconstruction attempt cell of the UE; wherein, the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), and the reconstruction attempt cell is the same as the cell from which the handover command is received for the last time.

In another application scenario, the counting unit 820 is configured to count, specifically, incorrect handover from a cell from which a handover command is received for the last time to the cell in which the RLF is detected may be counted once by the access device, if the RLF report received by the receiver 810 carries the cell information of the inter-system cell in which the UE selected to reside after detecting the RLF, and the RLF report also carries an RLF identifier, cell information of the cell from which the handover command is received by the UE for the last time, cell information of the cell in which the UE detects the RLF, cell information of a reconstruction attempt cell of the UE, RSRP values of a serving cell and a neighboring cell capable of being detected by the UE, and a second duration indication, wherein the second duration indication is used for indicating the length of time between receiving the handover command and detecting the RLF by the UE; and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell), the length of time indicated by the second duration indication is smaller than a preset second duration threshold, and the inter-system cell in which the UE selected to reside after detecting the RLF is different from the cell from which the handover command is received for the last time.

In another application scenario, the counting unit 820 is configured to count, specifically, incorrect handover from a cell from which a handover command is received by the UE for the last time to the inter-system target cell may, be counted once by the access device, if the RLF report received by the receiver 810 carries the cell information of the inter-system target cell for which the UE encounters the HOF and the cell information of the inter-system cell in which the UE resides after encountering the HOF, and the RLF report also carries an HOF identifier, cell information of the cell from which the handover command is received by the UE for the last time, cell information of the inter-system cell in which the UE resides after encountering the HOF and RSRP values of a serving cell and a neighboring cell capable of being detected by the UE; moreover, the inter-system target cell is different from the inter-system cell in which the UE resides after encountering the HOF, and the RSRP values are larger than preset corresponding RSRP thresholds (namely, the RSRP value of the serving cell is larger than a corresponding RSRP threshold of the serving cell, and the RSRP value of the neighboring cell is larger than a corresponding RSRP threshold of the neighboring cell).

Referring to FIG. 8-b, in an application scenario, the access device 800 may further include:

a parameter adjusting unit 830, configured to adjust (increase or decrease) an inter-system A2 threshold, if the proportion of, the number of abnormal handover(s) relevant to an A2 threshold from the cell in which the RLF is detected to the inter-system cell, counted by the counting unit 820 within at least one statistical period, with respect to the total number of abnormal handover(s) from the cell in which the RLF is detected to the inter-system cell, counted within the at least one statistical period, exceeds a preset value; or, adjust (increase or decrease) an inter-system A2 threshold, if the number of abnormal handover(s) relevant to an A2 threshold from the cell in which the RLF is detected to the inter-system cell, with respect to the total number of abnormal handover(s) from the cell in which the RLF is detected to the inter-system cell, counted by the counting unit 820 within at least one statistical period, exceeds the preset value.

For example, if the proportion of the number of early handover(s) relevant to the A2 threshold, with respect to the number of abnormal handover(s) from the cell in which the RLF is detected to the inter-system cell, counted by the counting unit 820 within the at least one statistical period, exceeds the preset value, then the parameter adjusting unit 830 may decrease the inter-system A2 threshold; or if the proportion of the number of late handover(s) relevant to the A2 threshold, with respect to the number of abnormal handover(s) from the cell in which the RLF is detected to the inter-system cell, counted by the counting unit 820 within the at least one statistical period, exceeds the preset value, then the parameter adjusting unit 830 may increase the inter-system A2 threshold. Wherein, there are several different ways for the parameter adjusting unit 830 to adjust (increase or decrease) the inter-system A2 threshold, for example, the parameter adjusting unit 830 may adjust the inter-system A2 threshold in a stepping manner, the stepping amplitude of adjusting the inter-system A2 threshold may be preset according to a specific scenario, and the stepping amplitude of adjusting (e.g., increasing or decreasing) the inter-system A2 threshold at each time may be equal or unequal.

It should be appreciated that, the access device 800 in the present embodiment may be the access device in the above-mentioned embodiments of a method, the functions of the functional units thereof may be specifically implemented according to the methods in the above-mentioned embodiments of a method, and the specific implementation process may refer to relevant descriptions of the above-mentioned embodiments of a method, and will not be described redundantly herein.

An embodiment of the present invention also provides a communication system, includes:

the access device 600 or the access device 800.

Referring to FIG. 9, an embodiment of the present invention also provides another communication system, may include:

A core network device 910 and an access device 920, wherein the core network device 910 and the access device 920 may be connected in a communicative manner. Wherein, the access device 920 may have a part or all of the functions of the access device 600 or the access device 800.

In the above-mentioned embodiments, different emphases are placed in descriptions of the embodiments. Those is not described in detail in a certain embodiment, may refer to relevant descriptions in other embodiments.

To sum up, in a solution adopted in an embodiment of the present invention, if an RLF report reported by a UE carries an A2 event indication recorded by the UE, an access device may count RLF event(s) relevant to an A2 threshold according to the A2 event indication in the RLF report, and this may provide an effective basis for the access device to optimize the A2 threshold, so as to benefit the access device to obtain a better A2 threshold optimization effect.

In another solution adopted in an embodiment of the present invention, if an RLF report generated and reported by a UE carries cell information of an inter-system cell in which the UE selected to reside after detecting RLF, or the RLF report carries cell information of an inter-system target cell for which the UE encounters handover failure, or the RLF report carries cell information of an inter-system target cell for which the UE encounters HOF and cell information of an inter-system cell in which the UE resides after encountering the HOF, then the access device may count the abnormal handover event(s) between the inter-system cells according to the cell information of the inter-system cells in the RLF report, and this may provide an effective basis for operations of the access device, such as optimizing handover parameters (e.g., the A2 threshold or the like) between the inter-system cells, and the like, so as to benefit the access device to obtain a better optimization effect of the handover parameters between the inter-system cells.

It should be appreciated for those of ordinary skill in the art that all or a part of the steps of the methods in the above-mentioned embodiments may be implemented with a computer program instructing corresponding hardware, the program may be stored in a computer readable storage medium, and the storage medium may include: a read-only memory, a random access memory, a magnetic disk, an optical disk, or the like.

The foregoing descriptions are detail introductions to the method, device and system for processing an RLF report and for statistically processing an abnormal event provided in the embodiments of the present invention, the principle and the implementation manner of the present invention are illustrated in this paper by utilizing specific examples, the illustration to the above-mentioned embodiments is merely used for helping to understand the methods of the present invention and core concepts thereof; and meanwhile, for those of ordinary skill in the art, modifications could be made to specific implementation and application range in accordance with the concept of the present invention. To sum up, the specification contents should not be construed as limiting the present invention.

What is claimed is:

1. A method for processing a radio link failure report, comprising:

generating, by a user equipment, a radio link failure report, wherein the radio link failure report carries an A2 event indication recorded by the user equipment, the A2 event indication is used for optimizing handover parameters between inter-frequency cells or inter-system cells, the A2 event indication indicates that the user equipment does not detect that a serving cell satisfies an inter-frequency A2 event or does not report an inter-frequency A2 event before occurrence of radio link failure (RLF); or the A2 event indication indicates that the user equipment detects that a serving cell satisfies an inter-frequency A2 event or has reported an inter-frequency A2 event before detecting RLF; or the A2 event indication indicates that the user equipment does not detect that a serving cell satisfies an inter-system A2 event or does not report an inter-system A2 event before detecting RLF; or the A2 event indication indicates that the user equipment detects that a serving cell satisfies an inter-system A2 event or has reported an inter-system A2 event before detecting RLF, and, the radio link failure report further carries cell information of an inter-system cell in which the user equipment selects to reside after encountering radio link failure (RLF), or cell information of an inter-system target cell for which the user equipment encounters handover failure (HOF), or cell information of an inter-system target cell for which the user equipment encounters HOF and cell information of an inter-system cell in which the user equipment resides after encountering the HOF; and reporting the radio link failure report;

wherein, if the radio link failure report carries the cell information of the inter-system cell in which the user equipment selects to reside after encountering the radio link failure (RLF), the radio link failure report further carries: an RLF identifier, cell information of a cell from which a handover command is received by the user equipment for the last time, cell information of a cell in which the user equipment detects the RLF, reference signal receiving power (RSRP) values of a serving cell and a neighboring cell capable of being detected by the user equipment, and a second duration indication, wherein the second duration indication indicates a length of time between receiving the handover command and detecting the RLF by the user equipment;

or, if the radio link failure report carries the cell information of the inter-system target cell for which the user equipment encounters the HOF, the radio link failure report further carries: an HOF identifier, RSRP values of a serving cell and a neighboring cell capable of being detected by the user equipment, cell information of a cell from which a handover command is received by the user equipment for the last time, and cell information of a reconstruction attempt cell of the user equipment;

or, if the radio link failure report carries the cell information of the inter-system target cell for which the user equipment encounters the HOF and the cell information of the inter-system cell in which the user equipment resides after encountering the HOF, the radio link failure report further carries: an HOF identifier, cell information of a cell from which a handover command is received by the user equipment for the last time, and RSRP values of a serving cell and a neighboring cell capable of being detected by the user equipment.

2. The method of claim 1, wherein, the radio link failure report further carries a first duration indication, wherein the first duration indication indicates a length of time between reporting an A2 event and detecting RLF by the user equipment, or the first duration indication indicates a length of time between detecting that a serving cell satisfies an A2 event and detecting RLF by the user equipment.

3. The method of claim 1, wherein, the handover parameters include A2 threshold.

4. A method for statistically processing an abnormal event, comprising:

receiving, by an access device, a radio link failure report;

counting at least one radio link failure (RLF) event relevant to an A2 threshold according to an A2 event indication, if the radio link failure report carries the A2 event indication, the A2 event indication is used for optimizing handover parameters between inter-frequency cells or inter-system cells, wherein, if the A2 event indication indicates that a user equipment does not detect that a serving cell satisfies an inter-frequency A2 event before detecting RLF, occurrence of the at least one RLF event relevant to an inter-frequency A2 threshold is counted once; or, if the A2 event indication indicates that a user equipment does not detect that a serving cell satisfies an inter-system A2 event before detecting RLF, occurrence of the at least one RLF event relevant to an inter-system A2 threshold is counted once; and counting the number of abnormal cell handovers according to information carried in the radio link failure report, if the radio link failure report carries cell information of an inter-system cell in which a user equipment selects to reside after encountering radio link failure (RLF), or cell information of an inter-system target cell for which a user equipment encounters handover failure (HOF), or cell information of an inter-system target cell for which a user equipment encounters HOF and cell information of an inter-system cell in which the user equipment resides after encountering the HOF;

wherein, if the radio link failure report carries the cell information of the inter-system cell in which the user equipment selects to reside after detecting the RLF, and the radio link failure report further carries: an RLF identifier, cell information of a cell from which a handover command is received by the user equipment for the last time, cell information of a cell in which the user equipment detects the RLF, reference signal receiving power (RSRP) values of a serving cell and a neighboring cell capable of being detected by the user equipment, and a second duration indication, wherein the second duration indication indicates a length of time between receiving the handover command and detecting the RLF by the user equipment; moreover, the length of time indicated by the second duration indication is larger than a preset second duration threshold, and the RSRP values are larger than preset corresponding RSRP thresholds, then late handover from the cell in which the RLF is detected to the inter-system cell which is selected to reside after the RLF is counted once;

or, if the radio link failure report carries the cell information of the inter-system target cell for which the user equipment encounters the HOF, and the radio link failure report further carries: an HOF identifier, RSRP values of a serving cell and a neighboring cell capable of being detected by the user equipment, cell information of a cell from which a handover command is received by the user equipment for the last time, and cell information of a reconstruction attempt cell of the user equipment, moreover, the RSRP values are larger than preset corresponding RSRP thresholds, and the reconstruction attempt cell is the same as the cell from which the handover command is received for the last time, then early handover from the cell from which the handover command is received for the last time to the inter-system target cell is counted once;

or, if the radio link failure report carries the cell information of the inter-system cell in which the user equipment selects to reside after encountering the RLF, and the radio link failure report further carries: an RLF identifier, cell information of a cell from which a handover command is received by the user equipment for the last time, cell information of a cell in which the user equipment detects the RLF, RSRP values of a serving cell and a neighboring cell capable of being detected by the user equipment, and a second duration indication, wherein the second duration indication is used for indicating a length of time between receiving the handover command and detecting the RLF by the user equipment; moreover, the RSRP values are larger than preset corresponding RSRP thresholds, the length of time indicated by the second duration indication is smaller than a set second duration threshold, and the resident inter-system cell selected by the user equipment after detecting the RLF is different from the cell from which the handover command is received for the last time, then incorrect handover from the cell from which the handover command is received for the last time to the cell in which the RLF is detected is counted once;

or, if the radio link failure report carries the cell information of the inter-system target cell for which the user equipment encounters the HOF and the cell information of the inter-system cell in which the user equipment resides after encountering the HOF, and the radio link failure report further carries: an HOF identifier, cell information of a cell from which a handover command is received by the user equipment for the last time, and RSRP values of a serving cell and a neighboring cell capable of being detected by the user equipment; moreover, the inter-system target cell is different from the inter-system cell in which the user equipment resides after encountering the HOF, and the RSRP values are larger than preset corresponding RSRP thresholds, then incorrect handover from the cell from which the handover command is received for the last time to the inter-system target cell is counted once.

5. The method of claim 4, wherein, if the radio link failure report further carries a first duration indication;

the first duration indication is used for indicating a length of time between reporting an A2 event and detecting RLF by a user equipment, or a length of time between detecting that a serving cell satisfies an A2 event and detecting RLF by a user equipment;

the counting at least one radio link failure (RLF) event relevant to an A2 threshold according to the A2 event indication, comprises:

if the A2 event indication indicates that the user equipment does not detect that a serving cell satisfies an inter-frequency A2 event before detecting the RLF, occurrence of the at least one RLF event relevant to an inter-frequency A2 threshold is counted once;

or, if the A2 event indication indicates that the user equipment does not detect that a serving cell satisfies an inter-system A2 event before detecting the RLF, occurrence of the at least one RLF event relevant to an inter-system A2 threshold is counted once;

or, if the A2 event indication indicates that the user equipment detects that a serving cell satisfies an inter-frequency A2 event before detecting the RLF, and the length of time indicated by the first duration indication is smaller than a first duration threshold, occurrence of the at least one RLF event relevant to an inter-frequency A2 threshold is counted once;

or, if the A2 event indication indicates that the user equipment detects that a serving cell satisfies an inter-system A2 event before detecting the RLF, and the length of time indicated by the first duration indication is smaller than a first duration threshold, occurrence of the at least one RLF event relevant to an inter-system A2 threshold is counted once.

6. The method of claim 4, the method further comprising:

if the number of the at least one RLF event relevant to the inter-frequency A2 threshold counted within at least one statistical period exceeds a preset first number threshold, adjusting the inter-frequency A2 threshold; or if the ratio of the number of the at least one RLF event relevant to the inter-frequency A2 threshold counted within at least one statistical period to the total number of abnormal handover(s) counted within the at least one statistical period exceeds a preset first proportion threshold, adjusting the inter-frequency A2 threshold;

or, if the number of the at least one RLF event relevant to the inter-system A2 threshold counted within at least one statistical period exceeds a preset second number threshold, adjusting the inter-system A2 threshold; or if the ratio of the number of the at least one RLF event relevant to the inter-system A2 threshold counted within at least one statistical period to the total number of abnormal handover(s) counted within the at least one statistical period exceeds a preset second proportion threshold, adjusting the inter-system A2 threshold.

7. The method of claim 4,
the method further comprising:
if the proportion of the number of abnormal handovers relevant to an A2 threshold from the cell in which the RLF is detected to the inter-system cell, counted within at least one statistical period, with respect to the total number of abnormal handovers from the cell in which the RLF is detected to the inter-system cell, counted within the at least one statistical period, exceeds a preset value, adjusting an inter-system A2 threshold;
or,
if the number of abnormal handovers relevant to an A2 threshold from the cell in which the RLF is detected to the inter-system cell, with respect to the total number of abnormal handovers from the cell in which the RLF is detected to the inter-system cell, counted within at least one statistical period, exceeds a preset value, adjusting an inter-system A2 threshold.

8. The method of claim 4, wherein,
the handover parameters include A2 threshold.

9. A user equipment, comprising:
a processor; and
a memory having processor-executable instructions stored thereon, the processor-executable instructions executed on the processor cause the processor to:
generate a radio link failure report, wherein the radio link failure report carries an A2 event indication recorded by the user equipment, the A2 event indication is used for optimizing handover parameters between inter-frequency cells or inter-system cells, the A2 event indication indicates that the user equipment does not detect that a serving cell satisfies an inter-frequency A2 event or does not report an inter-frequency A2 event before occurrence of radio link failure (RLF); or the A2 event indication indicates that the user equipment detects that a serving cell satisfies an inter-frequency A2 event or has reported an inter-frequency A2 event before detecting RLF; or the A2 event indication indicates that the user equipment does not detect that a serving cell satisfies an inter-system A2 event or does not report an inter-system A2 event before detecting RLF; or the A2 event indication indicates that the user equipment detects that a serving cell satisfies an inter-system A2 event or has reported an inter-system A2 event before detecting RLF, and the radio link failure report further carries cell information of an inter-system cell in which the user equipment selects to reside after encountering radio link failure (RLF), or cell information of an inter-system target cell for which the user equipment encounters handover failure (HOF), or cell information of an inter-system target cell for which the user equipment encounters HOF and cell information of an inter-system cell in which the user equipment resides after encountering the HOF; and
report the radio link failure report generated by the processors;
wherein, if the radio link failure report generated by the processor carries the cell information of the inter-system cell in which the user equipment selects to reside after detecting the RLF, the radio link failure report further carries: an RLF identifier, cell information of a cell in which the user equipment detects the RLF, cell information of a cell from which a handover command is received by the user equipment for the last time, reference signal receiving power (RSRP) values of a serving cell and a neighboring cell capable of being detected by the user equipment, and a second duration indication, wherein the second duration indication indicates a length of time between receiving the handover command and detecting the RLF by the user equipment;
or,
if the radio link failure report generated by the processor carries the cell information of the inter-system target cell for which the user equipment encounters the HOF, the radio link failure report further carries: an HOF identifier, RSRP values of a serving cell and a neighboring cell capable of being detected by the user equipment, cell information of a cell from which a handover command is received by the user equipment for the last time, and cell information of a reconstruction attempt cell of the user equipment;
or,
if the radio link failure report carries the cell information of the inter-system target cell for which the user equipment encounters the HOF and the cell information of the inter-system cell in which the user equipment resides after encountering the HOF, the radio link failure report further carries: an HOF identifier, cell information of a cell from which a handover command is received by the user equipment for the last time, and RSRP values of a serving cell and a neighboring cell capable of being detected by the user equipment.

10. The user equipment of claim 9, wherein the radio link failure report generated by the processor further carries a first duration indication, wherein the first duration indication indicates a length of time between reporting an A2 event and detecting RLF by the user equipment, or the first duration indication indicates a length of time between detecting that a serving cell satisfies an A2 event and detecting RLF by the user equipment.

11. The method of claim 9, wherein,
the handover parameters include A2 threshold.

12. An access device, comprising:
a processor; and
a memory having processor-executable instructions stored thereon, the processor-executable instructions executed on the processor cause the processor to:
receive a radio link failure report; and
count radio link at least one failure (RLF) event relevant to an A2 threshold according to an A2 event indication, if the radio link failure report received by the receiver carries the A2 event indication, the A2 event indication is used for optimizing handover parameters between inter-frequency cells or inter-system cells, count occurrence of the at least one RLF event relevant to an inter-frequency A2 threshold is counted once if the A2 event indication indicates that a user equipment does not detect that a serving cell satisfies an inter-frequency A2 event before detecting RLF; or count occurrence of the at least one RLF event relevant to an inter-system A2 threshold is counted once if the A2 event indication indicates that a user equipment does not detect that a serving cell satisfies an inter-system A2 event before detecting RLF;
and,
count the number of abnormal cell handovers according to information carried in the radio link failure report, if the radio link failure report carries cell information of an inter-system cell in which a user equipment selects to reside after encountering radio link failure (RLF), or cell information of an inter-system target cell for which a user equipment encounters handover failure (HOF), or cell information of an inter-system target cell for which a user equipment encounters HOF and cell information of an inter-system cell in which the user equipment resides after encountering the HOF;

wherein, the processor is configured to count, specifically, late handover from a cell in which the RLF is detected to the inter-system cell which is selected to reside after the RLF is counted once, if the radio link failure report carries the cell information of the inter-system cell in which the user equipment selects to reside after detecting the RLF, and if the radio link failure report further carries an RLF identifier, cell information of the cell in which the user equipment detects the RLF, cell information of a cell from which a handover command is received by the user equipment for the last time, reference signal receiving power (RSRP) values of a serving cell and a neighboring cell capable of being detected by the user equipment, and a second duration indication, wherein the second duration indication is used for indicating a length of time between receiving the handover command and detecting the RLF by the user equipment; and the length of time indicated by the second duration indication is larger than a preset second duration threshold, and the RSRP values are larger than preset corresponding RSRP thresholds;

or, the processor is configured to count, early handover from a cell from which a handover command is received for the last time to the inter-system target cell is counted once, if the radio link failure report carries the cell information of the inter-system target cell for which the user equipment encounters the HOF, and is the radio link failure report further carries an HOF identifier, RSRP values of a serving cell and a neighboring cell capable of being detected by the user equipment, cell information of the cell from which the handover command is received by the user equipment for the last time, and cell information of a reconstruction attempt cell of the user equipment, wherein the RSRP values are larger than preset corresponding RSRP thresholds, and the reconstruction attempt cell is the same as the cell from which the handover command is received for the last time;

or, the processor is configured to count, incorrect handover from a cell from which a handover command is received for the last time to the cell in which the RLF is detected is counted once, if the radio link failure report carries the cell information of the inter-system cell in which the user equipment selects to reside after detecting the RLF, and if the radio link failure report further carries an RLF identifier, cell information of the cell in which the user equipment detects the RLF, cell information of the cell from which the handover command is received by the user equipment for the last time, RSRP values of a serving cell and a neighboring cell capable of being detected by the user equipment, and a second duration indication, wherein the second duration indication is used for indicating a length of time between receiving the handover command and detecting the RLF by the user equipment; the RSRP values are larger than preset corresponding RSRP thresholds, the length of time indicated by the second duration indication is smaller than preset second duration threshold, and the inter-system cell in which the user equipment selects to reside after detecting the RLF is different from the cell from which the handover command is received for the last time;

or, processor is configured to count, incorrect handover from the cell in which the RLF is detected to the inter-system target cell is counted once, if the radio link failure report carries the cell information of the inter-system target cell for which the user equipment encounters the HOF and the cell information of the inter-system cell in which the user equipment resides after encountering the HOF, and is the radio link failure report further carries an HOF identifier, cell information of a cell from which a handover command is received by the user equipment for the last time, and RSRP values of a serving cell and a neighboring cell capable of being detected by the user equipment; wherein the inter-system target cell is different from the inter-system cell in which the user equipment resides after encountering the HOF, and the RSRP values are larger than preset corresponding RSRP thresholds.

13. The access device of claim 12, wherein, if the radio link failure report received by the processor further carries a first duration indication;

wherein the first duration indication indicates a length of time between reporting an A2 event and detecting RLF by a user equipment, or the first duration indication indicates a length of time between detecting that a serving cell satisfies an A2 event and detecting RLF by a user equipment;

the processor is configured to count, specifically, occurrence of the at least one RLF event relevant to an inter-frequency A2 threshold is counted once if the A2 event indication indicates that the user equipment does not detect that the serving cell satisfies an inter-frequency A2 event before detecting the RLF; or, occurrence of the at least one RLF event relevant to an inter-system A2 threshold is counted once if the A2 event indication indicates that the user equipment does not detect that the serving cell satisfies an inter-system A2 event before detecting the RLF; or, occurrence of the at least one RLF event relevant to an inter-frequency A2 threshold is counted once if the A2 event indication indicates that the user equipment detects that the serving cell satisfies an inter-frequency A2 event before detecting the RLF and the length of time indicated by the first duration indication is smaller than a first duration threshold; or, occurrence of the at least one RLF event relevant to an inter-system A2 threshold is counted once if the A2 event indication indicates that the user equipment detects that the serving cell satisfies an inter-system A2 event before detecting the RLF and the length of time indicated by the first duration indication is smaller than a first duration threshold.

14. The access device of claim 12, wherein, the processor is further configured to adjust the inter-frequency A2 threshold, if the number of the at least one RLF event relevant to the inter-frequency A2 threshold counted by the processor within at least one statistical period exceeds a preset first number threshold; or adjust the inter-frequency A2 threshold, if the ratio of the number of the at least one RLF event relevant to the inter-frequency A2 threshold counted by the processor within at least one statistical period, with respect to the total number of abnormal handovers counted within the at least one statistical period, exceeds a preset first proportion threshold;

or, configured to adjust the inter-system A2 threshold, if the number of the at least one RLF event relevant to the inter-system A2 threshold counted by the processor within at least one statistical period exceeds a preset second number threshold; or adjust the inter-system A2 threshold, if the ratio of the number of the at least one RLF event relevant to the inter-system A2 threshold counted by the processor within at least one statistical period, with respect to the total number of abnormal handovers counted within the at least one statistical period, exceeds a preset second proportion threshold.

15. The method of claim 12, wherein,
the handover parameters include A2 threshold.

* * * * *